United States Patent [19]

Malcolm et al.

[11] Patent Number: 4,912,997
[45] Date of Patent: Apr. 3, 1990

[54] ELECTRIC SHIFT SELECTOR MECHANISM FOR TRANSMISSION

[75] Inventors: Robert G. Malcolm, Pontiac; Joseph F. Goulart, Union Lake; Gregg T. Black, Livonia, all of Mich.

[73] Assignee: Chrysler Corporation, Highland Park, Mich.

[21] Appl. No.: 360,818

[22] Filed: Jun. 2, 1989

[51] Int. Cl.⁴ .................. B60K 41/22; B60K 20/04; B60K 20/16
[52] U.S. Cl. .................. 74/335; 74/473 R; 74/475; 74/476; 338/128
[58] Field of Search .......... 74/335, 473 R, 473 P, 74/476, 475; 338/128

[56] References Cited

U.S. PATENT DOCUMENTS

| | | | |
|---|---|---|---|
| 2,910,885 | 11/1959 | Bevacqua | 74/473 R |
| 3,570,636 | 3/1971 | Franz et al. | 74/473 R |
| 3,805,640 | 4/1974 | Schneider et al. | 74/645 |
| 4,343,202 | 8/1982 | Osborn | 74/476 |
| 4,355,543 | 10/1982 | Ikemoto et al. | 74/473 P |
| 4,442,730 | 4/1984 | Snoy | 74/475 |
| 4,445,541 | 5/1984 | Schmiel | 137/636.2 |
| 4,519,266 | 5/1985 | Reinecke | 74/471 XY |
| 4,564,906 | 1/1986 | Stephan et al. | 364/424.1 |
| 4,620,176 | 10/1986 | Hayes | 338/128 |
| 4,637,361 | 1/1987 | Killen et al. | 123/339 |
| 4,640,248 | 2/1987 | Stoltman | 423/399 |
| 4,653,341 | 3/1987 | Ferrario | 74/473 R |
| 4,712,640 | 12/1987 | Leigh-Monstevens et al. | 180/336 |
| 4,726,249 | 2/1988 | Inuzuka et al. | 74/473 P |
| 4,733,214 | 3/1988 | Andresen | 338/128 |
| 4,781,074 | 11/1988 | Long | 74/476 |
| 4,787,257 | 11/1988 | Ott et al. | 74/473 P |
| 4,790,204 | 12/1988 | Tury et al. | 74/483 PB |
| 4,799,397 | 1/1989 | Egidi et al. | 74/473 R |
| 4,817,468 | 4/1989 | Leigh-Monstevens et al. | 74/335 |
| 4,821,590 | 4/1989 | Tury et al. | 74/335 |

FOREIGN PATENT DOCUMENTS

| | | | |
|---|---|---|---|
| 2336007 | 7/1973 | Fed. Rep. of Germany | 338/128 |
| 56-164417 | 12/1981 | Japan | 74/473 R |
| 59-139417 | 8/1984 | Japan | 74/473 R |
| 60-92126 | 5/1985 | Japan | 74/473 R |
| 906846 | 9/1962 | United Kingdom | 74/475 |
| 1540096 | 2/1979 | United Kingdom | 338/128 |

OTHER PUBLICATIONS

Article from "Automotive Engineering", Mar., 1989, vol. 97, No. 3, pp. 76–77, entitled: Global Viewpoints.

Primary Examiner—Allan D. Herrmann
Assistant Examiner—Janice E. Chartoff
Attorney, Agent, or Firm—Edward P. Barthel

[57] ABSTRACT

An electric shift mechanism for an automotive transmission mechanism is disclosed in which a manual selector lever is universally mounted on a support adapted for sequentially pivoting north-south and east-west swingable rockers about associated intersecting axes. A gate limiting plate formed with a predetermined shift pattern is mounted on the support intermediate the rockers. The lower end of the lever has a ball follower for pre-loaded travel on a single cam track supported longitudinally on the east-west rocker. The cam track is contoured to simulate shift effort stability and feel of conventional manual gear shifting operations. The rockers allow crossover movement from a neutral lever position to preselect a desired gate for reciprocal fore and aft travel of the ball follower to selected transmission shift positions.

10 Claims, 5 Drawing Sheets

_Fig-9_

_Fig-11_

_Fig-10_

_Fig-12_

ELECTRIC SHIFT SELECTOR MECHANISM FOR TRANSMISSION

BACKGROUND OF THE INVENTION

This invention relates to the field of shifter mechanisms for use with automotive transmissions and more particularly pertains to a remote control manual shift selector mechanism which incorporates electrical position sensors operative for transmitting shift-by-wire signals to suitable actuators, thereby executing desired transmission gear selections.

With the advent of shift controls for vehicle transmissions employing electronic drive-by-wire technology, a need arose for a "shift-by-wire" manually operated shift control mechanism to satisfy traditional driver expectations of a conventional gearshift lever device. One example of a prior art electronically-controlled transmission system is a five speed transmission developed by Isuzu Motors called NAVIS. The NAVIS system is described in an article published in the JSAE Review magazine dated Nov. 1984 entitled "Isuzu New Transmission Control System". The article describes the system as follows:

"NAVIS is an automatic transmission capable of electronically controlling a dry clutch and a synchromesh gear transmission to permit easy driving, making maximum use of the excellent fuel economy of the manual transmission system. The adoption of a computer program duplicating the actions of experienced drivers in manual transmissions shifting and the select lever with conventional H-floor shift pattern enables a sporty gearshift, just like a manual transmission on the one hand and easy driving by merely depressing the accelerator pedal as an automatic transmission on the other."

The development of a remote control mechanism for a motor vehicle manual gear shift lever or handle to the transmission gear select and shifting rails has resulted in various solutions. An example of one such mechanism is found in U.S. Pat. No. 4,712,640 issued Dec. 15, 1987 to Leigh-Monstevens et al. entitled Hydraulic Remote Control For Motor Vehicle Manual Shift Transmission. The '640 patent discloses a driven member supported for both linear and rotary motion. A push-pull cable transmits the linear motion of the drive member to the driven member, and master and slave hydraulic linear actuators transmit the rotary motion of the drive member to the driven member so that the transmission is responsive to the shifting lever being moved along two perpendicular paths of motion in a gear shifting pattern.

The U.S. Pat. No. 4,640,248 issued Feb. 3, 1987 to Stoltman discloses a failsafe drive-by-wire engine control system in which the engine is set to an idle operating mode when the force applied to the accelerator pedal is in an off-idle position.

The U.S. Pat. No. 4,507,736 issued Mar. 26, 1985 to Klatt discloses a gear shift control system for a motor vehicle in which a micro-computer is fed signals representative of the output speed of the transmission and the selected gear positions.

The U.S. Pat. No. 4,790,204 issued Dec. 13, 1988 to Tury et al. discloses an electric shift apparatus for use with a motor vehicle having an automatic transmission. The apparatus includes a power module adapted to be mounted on the housing of the transmission proximate the transmission mode select lever and the transmission kick-down lever and a control module adapted to be mounted in the passenger compartment of the vehicle.

SUMMARY OF THE INVENTION

It is thus an object of the present invention to provide a novel manual selector lever mechanism adapted for remotely controlling a motor vehicle transmission by electrical signals.

It is another object of the present invention to provide a mechanism for remotely controlling a vehicle transmission electrically by means of a manual selector lever which is moved along two perpendicular paths of motion in a selection movement and a gear engagement shifting pattern allowing the driver to participate in the actual transmission speed changes while duplicating the mechanical feel of a conventional manual transmission gearbox.

It is another object of the present invention to provide a manual selector mechanism for an electric shift system with a motor vehicle transmission which maximizes performance and economy by maintaining exact control of the shift points.

It is still another object of the present invention to provide a novel select lever mechanism for a vehicle transmission "shift-by-wire" control system which includes adjustment means for allowing the driver to pre-select the level of simulated manual gear engagement selecting effort desired to move the lever into a desired transmission drive range.

It is yet another object of the present invention to provide a novel select lever control mechanism as set forth above wherein a gate limiting plate is adapted to be formed with a choice of gating positions such that a plurality of "shift-by-wire" patterns may be selected.

A further object of the present invention is to provide a novel select lever control mechanism as set forth above having independent crossover or preselection effort, i.e. lateral movement from a resiliently biased centering position providing minimum neutral play of the select lever.

An elongated select lever is pivotally mounted on a fixed support by a spherical-type universal coupling. A generally U-shaped north-south rocker is pivotally mounted on the support for swinging movement in a longitudinal direction about a transverse pivot axis. A generally U-shaped east-west rocker is pivotally mounted on the support for swinging movement in a lateral direction about a longitudinal pivot axis orthogonal to the transverse pivot axis. The select lever control mechanism includes a selector stem extending downwardly from the lever having a cam follower on its free end. A plunger return spring biases the cam follower in an axially extended downward manner onto a camming surface of a single longitudinal track of the east-west rocker. The selector stem extends through a transverse guide slot of the north-south rocker bight portion whereby fore and aft travel of the lever transmits longitudinal swinging motion to the north-south rocker.

A gate limiting plate is supported intermediate the bight portion of the north-south rocker and the base portion of the east-west rocker. A longitudinally extending camming track is carried on the east-west rocker base portion receiving the cam follower therein. The gate limiting plate has a determined select pattern such as, for example, a multiple-plane "H" type having a plurality of parallel longitudinal range slots and an interconnecting crossover pre-selection slot through which the select lever is movable. Each gate limiting plate longitudinal range slot defines one of a plurality of select planes allowing the stem cam follower to travel to either a fore or aft setting point of the cam track corresponding to a transmission shift position.

An electronic position indicator or sensor is located on each pivot axis and continuously monitors the rotational travel of each rocker pivot pin about its axis. A control module receives signals generated by the position indicators and incorporates memory and computer means adapted to indicate the instantaneous position of the cam follower as it is moved in the selected shift plane of the cam track. The cam follower is moved to fore or aft predetermined cam track releasably retained positions corresponding to selected transmission shift positions. The camming track has a predetermined contour operative to vary the spring preload on the cam follower. By varying the spring bias loading of the lever in a predetermined manner the selector mechanism simulates the gear engaging effort of a conventional gearshift lever.

A pair of compression springs bias the east-west rocker into a predetermined neutral position wherein the camming track is normally aligned in a vertically extending plane that includes the longitudinal pivot axis. A bias control rod is aligned on the lever principal axis and may be threadably reciprocated by a manual knob in the shift handle to vary the amount of frictional pressure applied to the cam follower enabling the driver to pre-select the desired level of shift effort.

These and other objects and advantages of the present invention will be apparent from the following description of a preferred embodiment thereof, together with the accompanying drawings wherein:

DETAILED DESCRIPTION OF THE INVENTION

Figures 1, 2:
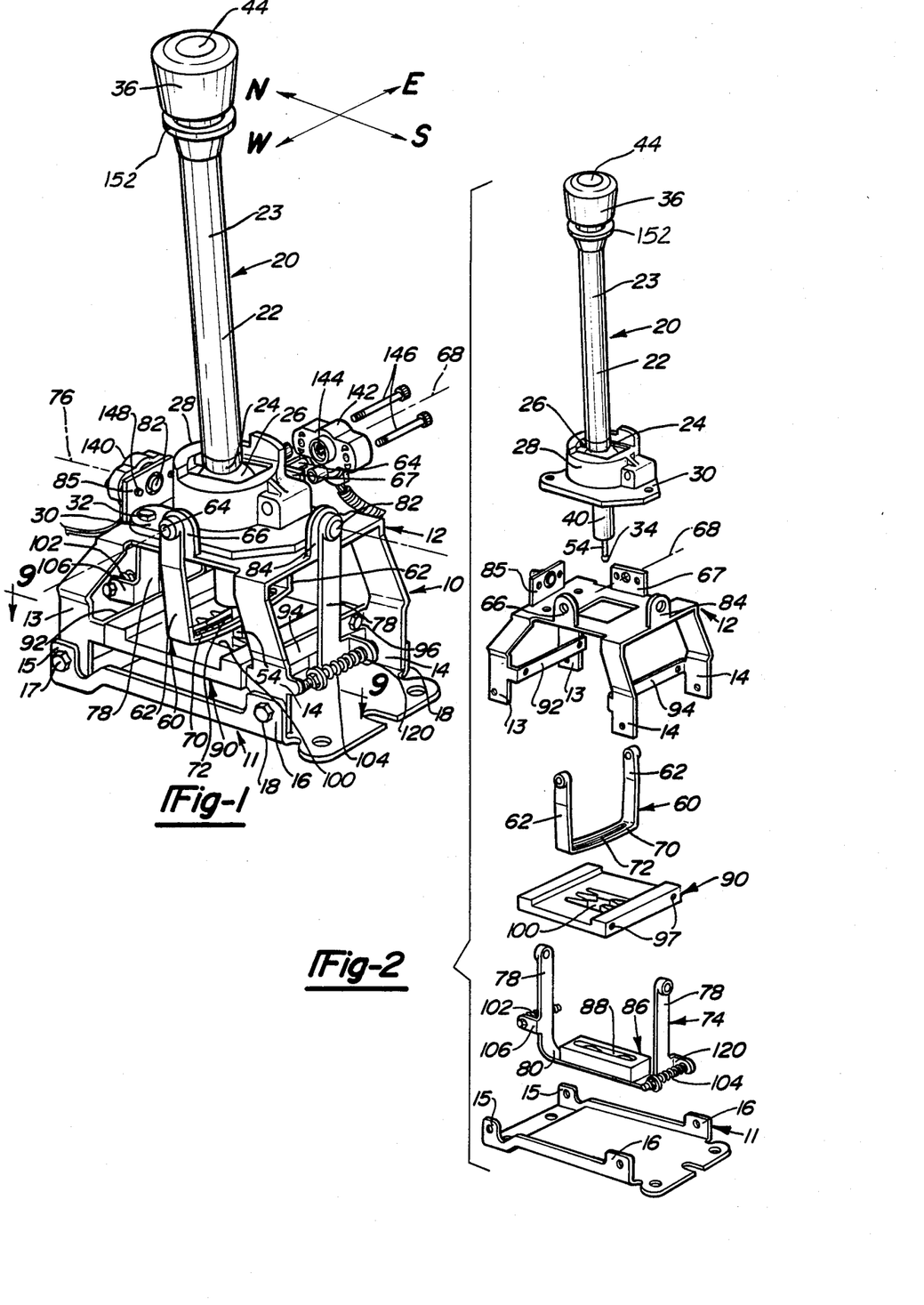
FIG. 1 is a perspective view of the preferred embodiment of the of the present invention.
FIG. 2 an exploded perspective view of the shifter of FIG. 1

Referring now to FIG. 1 of the drawings, the gear shifter mechanism of the present invention comprises a base assembly 10 including a lower base member 11 and an upper base member 12. The upper base member 12 has a pair of front legs 13—13 and a pair of rear legs 14—14 integral therewith and extending downwardly therefrom. The front and rear legs have their lower ends secured in overlapping relation to a pair of upstanding front tabs 15—15 and a pair of rear tabs 16—16 respectively. The front and rear tabs are integral with and bent upwardly from the lower base member 11 and are attached to their associated legs by suitable fastener means such as machine bolts 17 and 18, respectively.

Figures 3, 4:
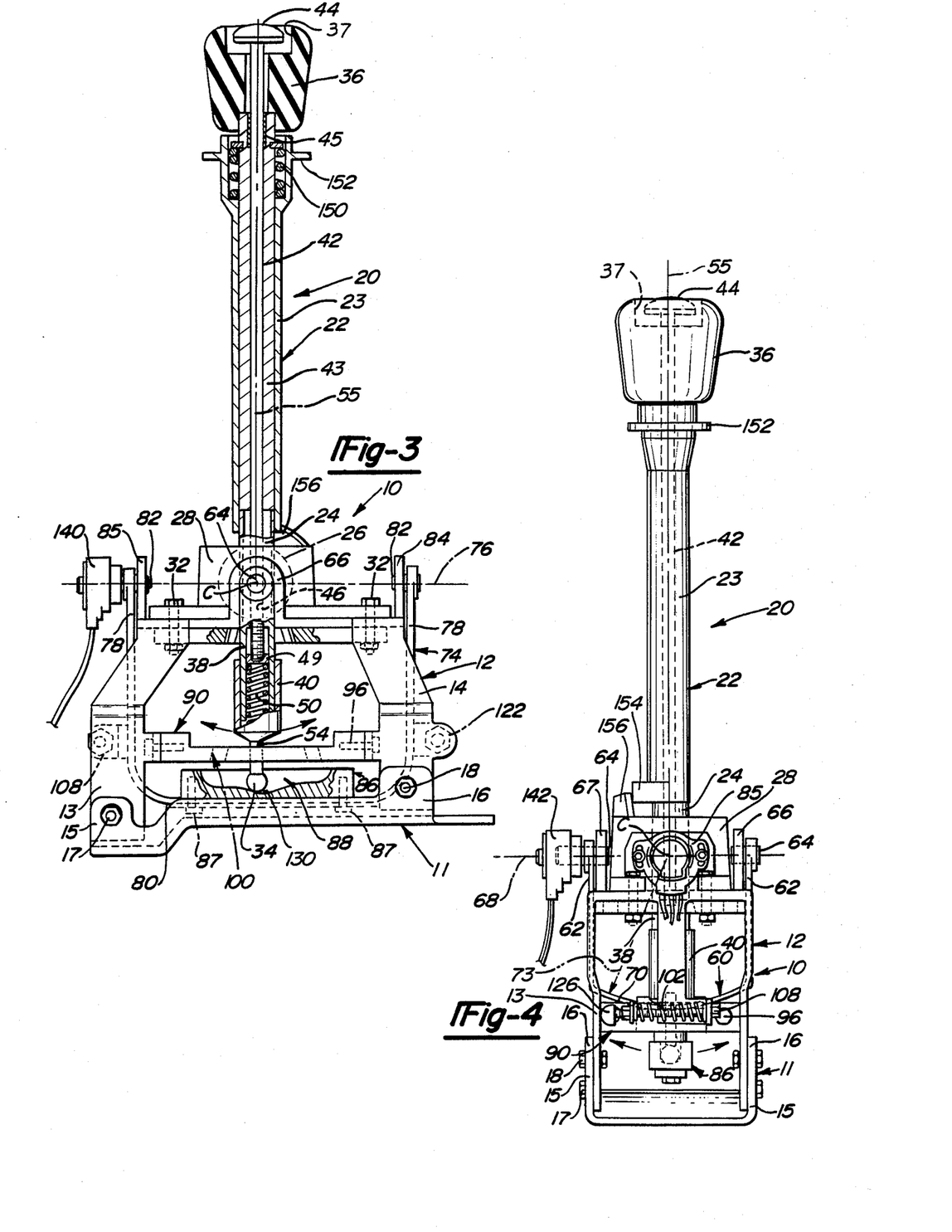
FIG. 3 a side elevational view with parts broken away of the shifter of FIG. 1.
FIG. 4 is an end elevational view of the shifter of FIG. 1.

As seen in FIGS. 2 and 3 the shifter mechanism further comprises an operating lever assembly 20, including an elongated shift lever, generally indicated at 22. The shift lever 22 includes an outer cylindrical sleeve 23 having an outer sleeve 23 arranged with its open lower end telescoped over an aligned upper end of an upper hollow tube portion 24. The tube portion 24 has its lower end suitably affixed to a spherical ball joint comprising a pivot ball 26 mounted for universal motion in a cup-shaped socket 28. A mounting plate 30, removably secured to the upper base member 14 by bolts 32, includes the cup-shaped socket 28 extending upwardly therefrom. The socket 28 spherically captures the pivot ball 26 therein allowing the shift lever 22 to universally move a lower ball follower 34 by means of its upper handle portion 36 in a shift-and-select operation. A counter sunk access recess 37 is formed in the upper end of handle portion 36.

Figure 8:
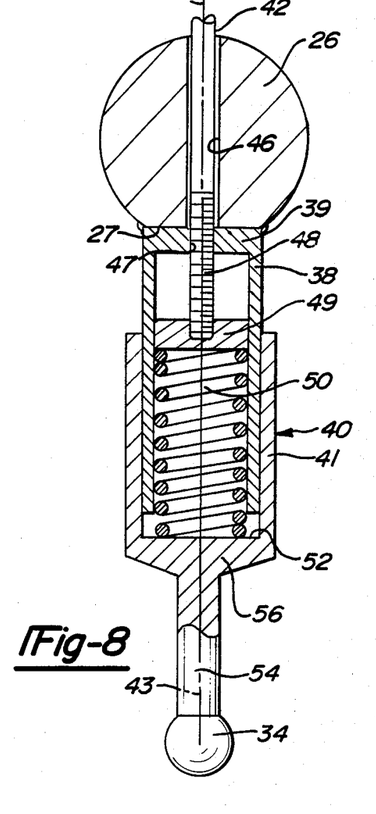
FIG. 8 an enlarged fragmentary vertical sectional view of the ball follower portion of the shift lever.

As shown in FIGS. 3 and 8 a lower hollow tube portion 38, aligned on the principal axis of the upper tube portion 24, with its upper blind end 39 fixed to a horizontal planar face 27 of pivot ball 26 so as to depend therefrom. FIG. 8 shows an end fitting 40 formed with a tubular sleeve 41 having its upper open end telescopically receiving the lower end of the tube portion 38 in an axially slidable manner.

It will be noted in FIG. 3 that a cylindrical calibration rod 42 is axially and rotatably movable in a central bore of inner tubular body 43 with the inner tubular body 43 fixedly secured to the outer sleeve 23. The control rod 42 extends concentrically within the shift lever tubular body 43 and has its upper end provided with a manual adjustment knob 44. The rod 42 passes through an upper journal 45 and an aligned axial bore 46 in the pivot ball 26, as seen in FIG. 8. Lower threaded end 48 of the rod engages an internally threaded bore 47 in the upper blind end 39 of the tube portion 38.

A disk-shaped cap 49 is supported on the control rod lower end for axial slidable positioning in the tube portion 38. Helical coil follower spring 50 is shown captured in compression between the cap 49 and the bottom 52 of the fitting sleeve 41. Stem portion 54, aligned on the principal axis 55 of the rod 42, extends from the fitting closed end 56 with the spring loaded ball follower 34 mounted on the stem's lower end. The operator is able to readily increase the amount of frictional pressure applied to the ball follower 34 on its associated track to be described. Thus, merely rotating the adjustment knob 44 in a clockwise direction causes the control rod threaded end 48 to threadably advance its cap 49 downwardly increasing the compressive force on biasing spring 50 and the ball follower 34.

FIGS. 1 and 2 show a U-shaped gear selection north-south rocker member 60 formed with legs 62—62 having their upper ends pivotally mounted by transverse aligned pins 64—64 to opposed ears 66 and 67 upstanding from respective sides of the upper base member 12. Accordingly, as seen in FIG. 1, the north-south rocker member 60 is adapted for swinging movement in a north-south or longitudinal direction about a transverse pivot axis 68 of the pins 64—64. The rocker member 60 legs 62—62 are interconnected by a transversely extending bight portion 70. The bight portion 70 includes a transversely extending elongated slotted passage 72 formed therein adapted to pass the selector lever stem 54 therethrough. It will be noted in FIG. 4 that the bight portion 70 is arcuate-shaped in transverse section with the arc defined by the radius 73 having its center oriented at spherical center "C" of the pivot ball 26.

A U-shaped main east-west rocker member 74 is pivotally mounted on the upper base member 12 and is adapted for swinging movement in a transverse or east-west direction about a longitudinal pivot axis 76, as seen in FIG. 1. The east-west rocker member 74 includes a pair of upstanding legs 78—78 and an interconnecting longitudinally extending bight portion 80. Each leg 78 has an upper end mounted on pivot pins 82—82 to opposed ears 84 and 85 upstanding from the respective ends of the upper base 12. The pivot pins 82—82 are shown in FIG. 3 aligned on the longitudinal axis 76.

It will be noted in FIGS. 3 and 4 that the longitudinal pivot axis 76 and the transverse pivot axis 68 are mutually perpendicular and pass through a common intersection point "C". Intersection point "C" is the center of universal pivot means which in the disclosed embodiment is the ball joint of pivot ball 26 and socket 28. Further, the principal axis 43 of the shift lever control rod 42 and stem portion 54 also passes through the common intersection point "C".

FIGS. 2 and 3 show a generally elongated guide block 86 secured, as by bolts 87—87 in blind bores 85 (FIG. 11), to the upper surface of the bight portion 80. It will be noted that the guide block 86 has a longitudinally extending single rocking ball track 88 formed therein. The ball follower 34 is adapted for longitudinal reciprocal travel in a captured manner in the single ball track 88 as the shift lever 22 swings the north-south rocker member 60 fore and aft about pivot axis 68.

Figures 5, 6:
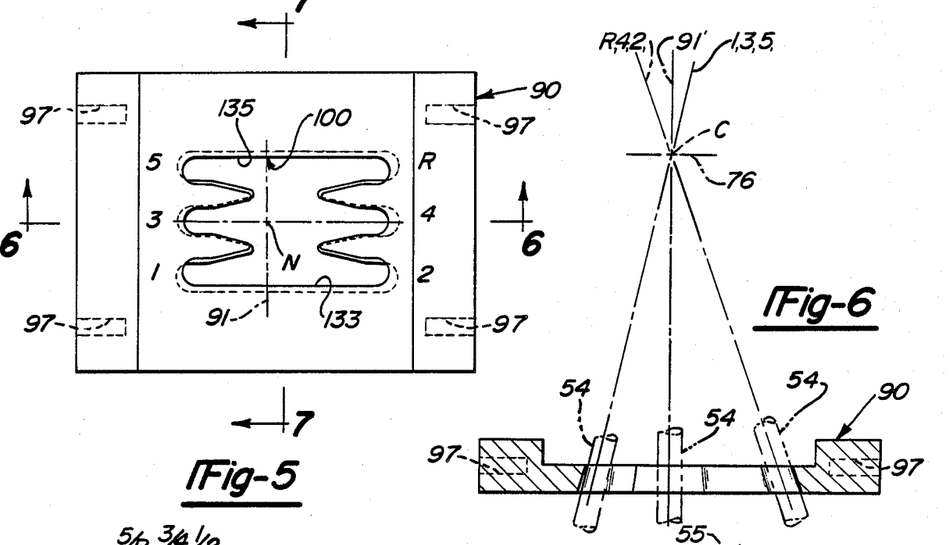
FIG. 5 is an enlarged detail top elevational view of the shifter gate limiting plate.
FIG. 6 is a vertical sectional view taken on line 6—6 of FIG. 5.

With reference to FIGS. 2 and 5 a shifter gate member or gate limiting plate, generally indicated at 90, is secured between a pair of transverse fore 92 and aft 94 straps of the base member 12. The straps 92,94 extend between the front and rear pair legs 13—13 and 14—14 respectively, of the upper base member 12 and secure the gate member 90 by fasteners such as bolts 96 received in corresponding blind bores 97 (FIG. 5). As seen in FIGS. 1 and 3 the shift lever stem 54 passes through the north-south rocker transverse slotted passage 72 and is guided by a modified or double H-shaped shift gate pattern defined by opening 100 formed by a plurality of parallel longitudinal speed ratio shift slots and an intersecting transverse crossover select slot in the gate member 90.

Figures 9, 11:
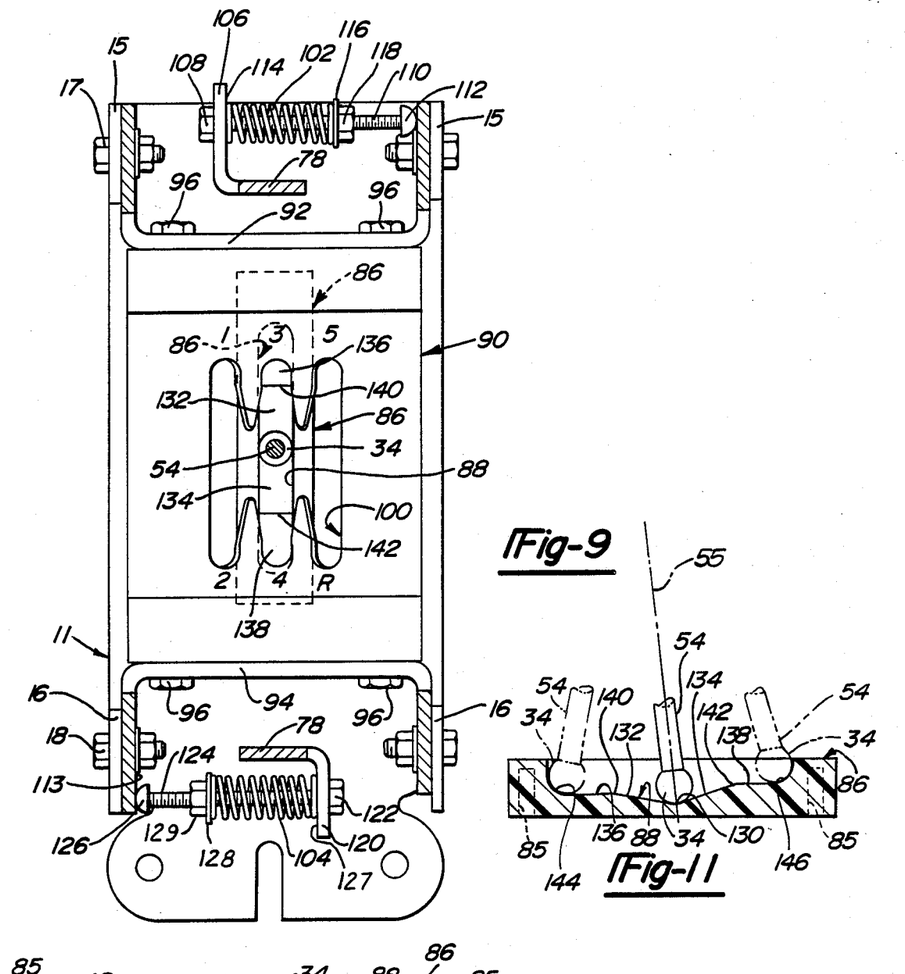
Fig. 9 is a horizontal sectional view taken generally on line 9—9 of FIG. 1.
FIG. 11 is a vertical sectional view, partly in elevation, taken on line 11—11 of FIG. 10.

As seen in FIG. 9 the three plane shift gate pattern opening 100 comprises three parallel north-south shift slots intersected by a transverse crossover select slot in which the lever stem is movable. The fore and aft ends of the north-south slots are identified by appropriate numerals and the letter "R" indicating the selected forward speed ratios and reverse gear signals respectively, that will be sent to and produced in a transmission electronic control module or unit according to the position of the shift lever cam follower ball 34.

It will be seen that a three-plane or double H gate shift pattern is defined in the gate member 90 by three north-south shift slots identified as shift slots 1-2, 3-4, and 5-R. The crossover or preselection slot lies midway between the ends of the three north-south shift slots and extends substantially through transverse construction lines 91 and 91' shown in FIGS. 5 and 6, respectively, defining a preselection plane. A neutral phase or mode "N" of the shift pattern is established with the shift lever follower ball 34 shown in FIGS. 9 and 11 in its ball track neutral transversely centered position with the east-west rocker member legs 78—78 oriented vertically in the vertical plane of symmetry of the mechanism including longitudinal pivot axis 76. A neutral self-centering or self-biasing of the shift lever 22 is provided by fore and aft helical compression self-centering springs shown at 102 and 104 respectively, in FIG. 9. The forward self-centering spring 102 is supported by a forward projecting right-angle tab 106 bent from the forward leg 78 of the main rocker member 74. A transverse forward mounting bolt 108 has its threaded shank 110 extending rightward from the front tab 106 with its free end having a resilient elastomeric stop 112 located thereon abutting inner face 113 of the strap portion. The self-centering spring 102 surrounds the shank 110 and is compressed between tab inner face 114 and a seating washer 116 selectively positioned by an adjustment nut 118 threaded on the stem 110. Thus, pivoting movement of the main rocker member 74 to the right in FIG. 9 causes compression loading of the forward self-centering spring 102 providing lateral or crossover effort as the shift lever handle 36 is moved manually to the left by the operator. It will be noted that the preload of the self-centering spring 102 can be tailored by the selection of the spring 102 during assembly with a predetermined spring constant. The self-centering spring 102 may also be adjusted by varying the compression preload upon rotation of the adjustment nut 118 in either a clockwise or counter-clockwise direction.

The aft self-centering spring 104 is supported by aft projecting right angle tab 120 bent from the aft leg 78 of the main rocker arm 74. A transverse aft mounting bolt 122 has its threaded shank 124 extending leftward through a hole in the tab 120 with its free end having a resilient elastomeric stop 126 located thereon abutting the inner opposed face of a front leg 13. The aft self-centering spring 104 surrounds the shank 124 and is captured in a preloaded manner between the inner face 127 of the aft tab 120 and by seating washer 128 adjustably retained on the shank 124 by adjustment nut 129. Thus, pivoting movement of the main rocker 74 to the left in FIG. 9 causes compression loading of the aft centering spring 104 providing lateral crossover effort as the shift handle 36 is moved manually to the right by the operator. In the same manner as set forth above the spring constant of the aft centering spring 104 may be selected during assembly or subsequently adjusted by rotation of the adjustment nut 129 to tailor the crossover effort.

Figures 10, 12:
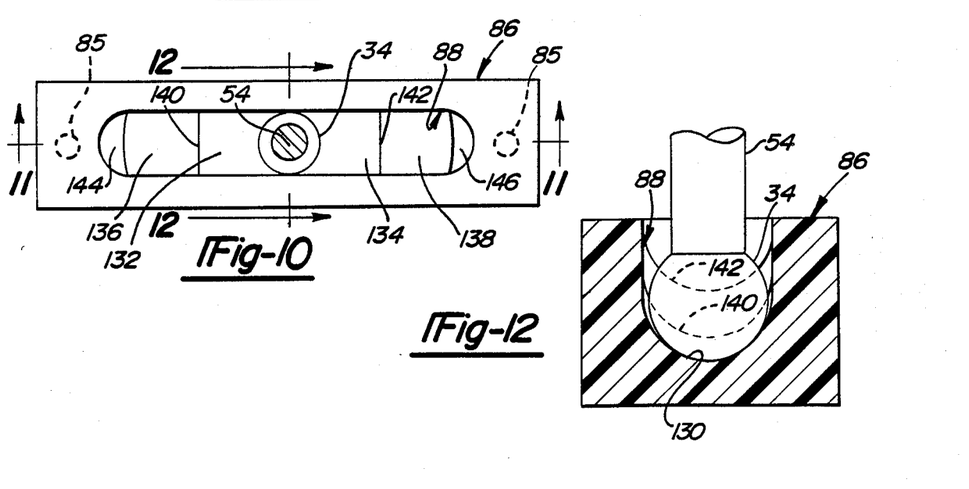
FIG. 10 is an enlarged top elevational detail view of the ball track member shown in FIGS. 1 and 2.
Fig. 12 is an enlarged vertical sectional view, partly in elevation, taken substantially on the line 12—12 of FIG. 10.

The cam follower ball 34 is pre-loaded by the shift lever compression spring 50 and, as seen in FIG. 3, is constantly urged downwardly as it moves along a segmented camming surface of the track 88 thus providing the operator with the desired shift effort stability and feel. FIGS. 10 and 11 show the cam surface or track formed with a neutral depressed setting point 130 into which the cam follower ball 34 is biased in a releasably retained manner by the stem return spring 50.

As seen in FIG. 10 the cam surface is formed in a substantially mirror image manner with diverging forward and aft complementary upwardly sloping segments 132 and 134. The segments 132 and 134 are succeeded by fore and aft downwardly sloping segments 136 and 138, respectively, separated therefrom by fore and aft transverse transition ridges 140 and 142. The cam surface terminates in fore and aft transmission selected shift positions or speed settings determined by shoulders or radii 144 and 146, respectively, adapted to releasably capture or retain the spring biased cam follower ball 34 after predetermined fore or aft travel thereof. The segmented or contoured cam track 88 provides shift effort stability and feel to the driver in connection with gear selecting operations as the cam follower ball rides on the cam track.

It will be noted in FIG. 11 that the cam track longitudinal profile is asymmetrical in that the segments 132 and 134 are sloped at unequal angles relative to the undersurface of the guide block. FIG. 11 shows the shift lever stem portion 54 leaning forwardly at a slight angle from the vertical in its full-line neutral. Canting the select lever stem portion 54 forwardly compensates for the installed position of the select mechanism in the vehicle wherein the mechanism, including the forward end of the guide block 86, is tilted upwardly at a slight angle from the horizontal. Thus, upon the shift mechanism being installed on the vehicle floor pan the shift lever stem portion 54 will assume a vertical position in neutral with ball follower 34 captured in its setting point 130. It will be noted that in neutral the shift lever principal axis 55 lies substantially in the transverse plane that bisects the included angle defined by the intersecting track segments 132 and 134. FIG. 3 shows the shift lever 22 moved to vertical position with the shifter base assembly 10 oriented in a horizontal manner prior to its installation in a vehicle. Thus, the ball follower 34 is shown moved out of its neutral setting point 130 and partially advanced along the forward segment 132 of the camming track.

The amount of track shift effort may also be selected by adjusting the pre-load on the ball follower 34. The track shift effort is controlled by rotating the calibration rod 42 by turning the adjustment knob 44.

By virtue of the shift lever stem 54 traveling in the transverse guide slot 72 the shift lever 22 transmits longitudinal swinging motion to the north-south rocker 60 as the ball follower 34 travels in the track 88 to reflect the desired gear selection in unison with the transverse positioning of the main rocker 74 by the ball follower. It will be noted that both the north-south 60 and the east-west 74 rockers swing on the same pivot as the shift lever pivot ball socket center. That is the transverse pivot axis 68 of the north-south rocker 60 and the longitudinal pivot axis 76 of the east-west rocker intersect at point "C" in FIG. 3 which point "C" is the pivot center of the shift lever pivot ball 26 and its socket 28.

Figure 7:
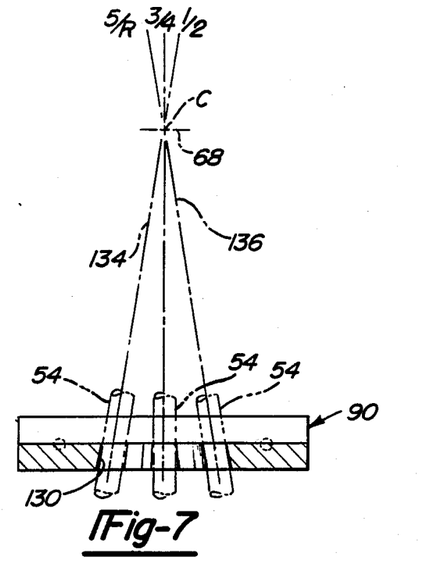
Fig. 7 is a vertical sectional view taken on the line 7—7 of FIG. 5.

With reference to FIG. 7 it will be seen that the transmission first and second speeds can be attained by pivoting the shift lever 22 to the right from the ¾ speed vertical shift plane until the stem 54 contacts side wall 133 of the gate opening 100. The shifting movement in this instance takes place in a first shift plane, indicated by dashed construction line 134, substantially coincident with the principal axis 55 of the shift lever.

Pivoting the shift lever 22 to the left from the preselection plane to its opposite position until the stem 54 contacts side wall 135 permitting engagement of the fifth speed or reverse gear as seen by the 5/R dashed construction line 136 in FIG. 7.

With reference to FIGS. 1, 3, and 4 it will be seen that longitudinal and transverse pivot axis electrical measurement or comparison position indicators or sensors, in the form of rotary angle instrument sensors 140 and 142 respectively, are provided on the shifter upper base 12. The longitudinal axis 76 rotary angle position sensor 140 is adapted to measure the lateral selector or crossover position of the ball follower 34 while the transverse axis 68 rotary angle position sensor 142 is adapted to measure the longitudinal drive ratio shift position of the ball follower 34. As seen in FIG. 1 the position sensor 142 has a socket 144 adapted for receiving an extended portion of transverse pivot pin 64 in a locked manner. A pair of bolts 146 are provided to fixedly secure the position sensor 142 on its associated upper base member ear 67. In the same manner position sensor 140 is mounted on an extended portion of longitudinal pivot pin 82 and fixed to ear 85 by bolts 148.

Figures 13, 13A, 13B:
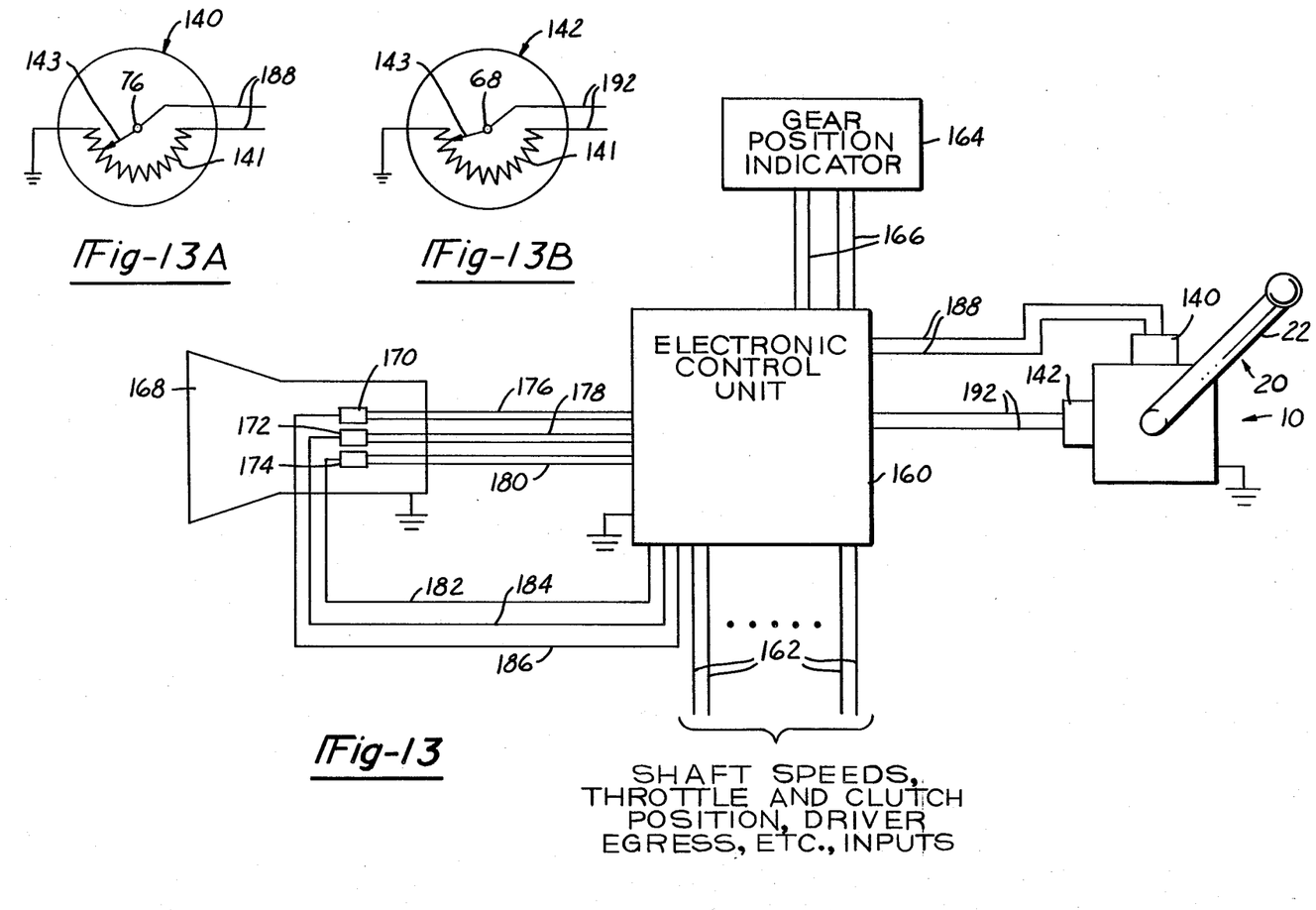
Fig. 13 is an electrical schematic diagram for the invention shift selector mechanism.
FIGS. 13A and 13B are electrical schematic diagrams of the position sensors 140 and 142, respectively, of FIG. 13.

In the preferred embodiment of the instant invention, as seen schematically in FIGS. 13A and 13B, the position sensors are each in the form of an electrical potentiometer instrument comprising a resistance coil 141 contacted by a movable contact or wiper arm 143. An example of one form of a position sensor suitable for use with the invention is found in U.S. Pat. No. 4,637,361 issued Jan. 20, 1987 to Killen et al. The '361 patent, assigned to the assignee of the instant application, is hereby incorporated by reference herein.

Rotation of the selector lever 22 about the transverse axes 68, for example, results in correlative rotational action of the of the pivot pins 64—64 and the potentiometer movable wiper arm 143 of rotary position sensor 142 thereby indicating an electrical signal or emf emitted from the sensor 142. In the same manner rotation of the lever 22 about the longitudinal axis 76 results in correlative rotational action of the pivot pins 82—82 and the potentiometer movable wiper arm 143 of rotary position sensor 140 thereby indicating an electrical signal or emf emitted from the sensor 140.

As the selector lever changes its position from neutral to first speed gear "1", for example, corresponding change in the position of each rotary sensor wiper arm results thereby indicating an electrical signal or emf generated from each position sensor 140 and 142. As the lever 20 is shifted from first speed gear "1" to second speed gear "2" each wiper arm 143 moves a corresponding amount thereby producing a different electrical signal. In the present form the electrical signal consists of a voltage reading as a function of resistance, typical of a potentiometer. A suitable control device is provided to which the rotary position sensors 140 and 142 are electrically connected, such as monitoring means, memory means, or computer means, for example; adapted to calculate the position of the lever and thereby operate an automotive transmission.

With reference to FIG. 3 it will be seen that the outer sleeve portion 23 and the inner tube body 43 are reciprocally supported on the calibration rod 42 and are biased downwardly by coil compression spring 150. The members 23 and 43 are displaced upwardly against the bias of spring 150 by means of an actuating flange 152 formed at the upper end of the outer sleeve 23. FIG. 4 shows a lockout lug 154 formed on the lower end of the outer sleeve shown biased downwardly into its locking position with lockout tab 156 formed on the socket 28. Upward displacement of the outer sleeve and inner body tube 43 to achieve displacement of the lockout lug 154 to its released position.

In operation, various input signals, such as described above and shown in FIG. 13, are supplied to an electronic control unit 160 which may include a programmable logic array or microprocessor. The control unit may receive input signals such as shift speeds, throttle and clutch position, driver egress, etc., via leads 162. Further, a gear position indicator module 164 is adapted to display and confirm gear changes commanded by the control unit 160. A transmission assembly, including a housing 168, enclose a transmission assembly, has gear change actuators 170, 172 and 174 thereon operative to receive control signals from the unit 160 via leads 176, 187 and 180 respectively. Leads 182, 184 and 186 are connected to the actuators 170, 172 and 174 respectively, and adapted to supply position feedback to the unit 160.

The selector mechanism is shown schematically at 20 in FIG. 13 with leads 188 connecting lateral or crossover select position sensor 140 to the control unit 160. The leads 192 connect the longitudinal drive ratio shift position sensor 142 to the control unit 160.

It is understood that the invention is not limited to the exact construction and operating arrangement illustrated and described above but that various changes and modifications may be made without departing from the spirit and scope of the invention as defined in the following claims.

What is claimed is:

1. A selector mechanism capable of being operatively linked by electrical signals with a control system for remotely controlling a vehicle transmission, the shifter mechanism comprising:
    a support;
    a driver operated shift lever, including a handle portion on its upper end, mounted on said support at an intermediate portion of said lever for movement about longitudinal and transverse pivot axes intersecting at a common point coincident with the principal axis of said shift lever;
    a north-south rocker member pivotally mounted on said support for swinging movement in a longitudinal direction about said transverse pivot axis, said north-south rocker member having transversely extending support means thereon;
    an east-west rocker member pivotally mounted on said support for swinging movement in a transverse direction about said longitudinal pivot axis, said east-west rocker member having longitudinally extending support means thereon positioned in spaced subjacent relation to said north-south support means, said east-west rocker member support means having a longitudinally extending camming track thereon;
    position sensor means associated with each said transverse and longitudinal pivot axis to provide an electrical signal in accordance with the rotary angular position of each said respective north-south and east-west rocker member;
    a receiving element on the lower end of said lever supporting a selector stem portion for reciprocal travel on the principal axis of said lever, said receiving element including biasing means for biasing a cam follower on the lower free end of said stem portion axially away from said common point;
    a gate limiting plate mounted on said support intermediate said north-south rocker member support means and said east-west rocker member support means, said gate limiting plate formed with a plurality of longitudinally extending shift slots interconnected by a crossover select slot, whereby said slots define a predetermined shift pattern for said lever;
    each said shift slot and said common point defining a longitudinal shift plane along which a transmission speed ratio being identified at the shift slot fore and aft ends by said transverse axis position sensor means;
    said selector stem restricted to transverse movement by said north-south rocker support means for predetermined longitudinal movement in a selected one of said gate limiter plate shift slots while said cam follower is adapted for longitudinal travel in said camming track; and
    said biasing means operative to urge said cam follower into constant pressure contact with said camming track a said shift lever is manipulated through said gate limiting plate shift pattern, said camming track being formed with a predetermined contour operative to preload said cam follower such that it is releasably captured at predetermined gate pattern locations corresponding to said identified fore and aft shift slot ends.

2. The shifter mechanism as set forth in claim 1, wherein second biasing means on said support operative to urge said east-west rocker member into a predetermined transversely centere position.

3. The shifter mechanism as set forth in claim 1, wherein said north-south rocker member being generally U-shaped having a pair of upstanding legs pivotally mounted on said support for swinging movement about said transverse pivot axis.

4. The shifter mechanism as set forth in claim 1, wherein said east-west rocker member having a pair of upstanding legs pivotally mounted on said support for swinging movement in a transverse direction said longitudinal pivot axis.

5. The shifter mechanism as set forth in claim 1, wherein each said position sensor means in the form of an electrical potentiometer instrument comprising resistance coils contacted by a contact arm pivotal about its associated pivot axis.

6. The shifter mechanism as set forth in claim 1, wherein means being provided for calibrating said biasing means.

7. The shifter mechanism as set forth in claim 1, wherein spring biasing means operative to bias said east-west rocker member into a predetermined position corresponding to a neutral mode of said gate limiting plate shift pattern.

8. A vehicle shifter mechanism capable of being operatively linked by electronic control signals with a multiple speed power transmission drive gear system for manually controlling the transmission, the shifter mechanism comprising:
    a support;
    an elongated shift lever, including a handle portion on its upper end, mounted on said support at an intermediate portion of said lever for movement about longitudinal and transverse pivot axes intersecting at a common point coincident with the principal axis of said shift lever;

a generally U-shaped north-south rocker member having a pair of upstanding legs pivotally mounted on said support for swinging movement in a longitudinal direction about said transverse pivot axis, said north-south rocker member legs interconnected by a transversely extending bight portion;

a generally U-shaped east-west rocker member having a pair of upstanding legs pivotally mounted on said support for swinging movement in a transverse direction about said longitudinal pivot axis, said east-west rocker member legs interconnected by a longitudinally extending base portion positioned in spaced subjacent relation to said north-south bight portion, said base portion supporting a longitudinally extending caming track thereon;

position sensor means associated with each said transverse and longitudinal pivot axis to provide an electrical signal in accordance with the angular position of each said respective north-south and east-west rocker member;

a receiving element on the lower end of said lever slidably supporting a selector stem portion for reciprocal travel on the principal axis of said lever, said receiving element including first spring biasing means for biasing a cam follower on the free end of said slidable stem portion axially away from said common point;

a gate limiting plate mounted on said support intermediate said north-south rocker member bight portion and said east-west rocker member base portion, said gate limiting plate formed with a plurality of longitudinally extending through shift slots intersecting by a crossover select through slot defining a predetermined shift pattern for said lever;

each said shift slot and said common point defining a longitudinal shift plane along which transmission speed ratios being identified at the shift slot fore and aft ends by said transverse axis position sensor means;

said selector stem extending through a transverse slot in said north-south rocker member bight portion for predetermined longitudinal movement in a selected one of said gate limiter plate longitudinal through slots while said cam follower is adapted for longitudinal travel in said camming track;

said first spring biasing means operative to urge said cam follower into continual pressure contact with said camming track as said shift lever is manipulated through said gate limiting plate shift pattern, said camming track being formed with a predetermined contour in longitudinal cross section operative to preload said cam follower such that it is releasably captured at predetermined gate limiting plate shift pattern locations corresponding to said identified fore and aft shift slot ends and an intermediate neutral position; and second spring biasing means operative to bias said east-west rocker member into a predetermined transversely centered position.

9. The shifter mechanism as set forth in claim 8, wherein means being provided for calibrating said first spring biasing means.

10. The shifter mechanism as set forth in claim 8, wherein each said position sensor means in the form of an electrical potentiometer instrument comprising resistance coils contacted by a contact arm pivoted about its associated pivot axis.

* * * * *